US009857841B2

(12) United States Patent
DeSilva et al.

(10) Patent No.: US 9,857,841 B2
(45) Date of Patent: *Jan. 2, 2018

(54) MODULAR GANG BOX DOCKING SYSTEM FOR COMPUTING DEVICES

(71) Applicant: Switchform, LLC, Gardnerville, NV (US)

(72) Inventors: Brett Logan DeSilva, Lakewood, CA (US); Bryan Scott Randall, Torrance, CA (US)

(73) Assignee: SWITCHFORM, LLC, Gardnerville, NV (US)

( * ) Notice: Subject to any disclaimer, the term of this patent is extended or adjusted under 35 U.S.C. 154(b) by 338 days.

This patent is subject to a terminal disclaimer.

(21) Appl. No.: 14/810,306

(22) Filed: Jul. 27, 2015

(65) Prior Publication Data

US 2016/0041584 A1    Feb. 11, 2016

Related U.S. Application Data

(63) Continuation-in-part of application No. 14/452,048, filed on Aug. 5, 2014, now Pat. No. 9,122,449.

(51) Int. Cl.
*G06F 1/16* (2006.01)
*H02G 3/08* (2006.01)
(Continued)

(52) U.S. Cl.
CPC ......... *G06F 1/1632* (2013.01); *H02G 3/081* (2013.01); *H02G 3/121* (2013.01); *H02J 7/0044* (2013.01);
(Continued)

(58) Field of Classification Search
CPC ....... G06F 1/1632; G06F 1/1626; H02G 3/14; H02G 3/121; H02G 3/081; H02G 3/12;
(Continued)

(56) References Cited

U.S. PATENT DOCUMENTS 4,835,343 A    5/1989 Graef et al.
4,958,048 A    9/1990 Bell
(Continued)

FOREIGN PATENT DOCUMENTS

WO    WO 2013169650    11/2013

*Primary Examiner* — Adrian S Wilson
*Assistant Examiner* — Abhishek Rathod
(74) *Attorney, Agent, or Firm* — Entralta P.C.; Justin G. Sanders; Peter D. Weinstein

(57) ABSTRACT

A modular docking system for being installed adjacent to an at least one additional electrical component within a gang box. In at least one embodiment, the system provides a docking plate engagable with the gang box and configured for removably receiving an at least one computing device. The docking plate provides an at least one elongate mounting aperture for allowing a screw to pass therethrough and be engaged with an at least one free mounting tab of the gang box while also allowing the docking plate to be selectively offset relative to the gang box. An at least one component adapter is engagable with one of a pair of opposing component tabs of the electrical component for increasing a height of the electrical component so as to substantially approximate a height of the docking plate.

20 Claims, 8 Drawing Sheets

(51) Int. Cl.
*H02J 7/00* (2006.01)
*H02G 3/10* (2006.01)
*H02G 3/12* (2006.01)

(52) U.S. Cl.
CPC ............. *H02J 7/0052* (2013.01); *H02G 3/10* (2013.01); *H02G 3/12* (2013.01)

(58) Field of Classification Search
CPC ......... H02G 3/10; H02G 3/088; H02J 7/0044; H02J 7/0052; H01R 25/006; A47G 29/08; A47K 10/12
USPC .................. 361/679.41, 679.45; 455/556.1; 220/3.2–3.94, 4.01–4.02
See application file for complete search history.

(56) References Cited

U.S. PATENT DOCUMENTS

| | | | |
|---|---|---|---|
| 5,243,134 A * | 9/1993 | Nattel | H02G 3/12 174/481 |
| 5,456,373 A | 10/1995 | Ford | |
| 5,539,821 A | 7/1996 | Blonder | |
| 5,744,750 A | 4/1998 | Almond | |
| 7,201,611 B2 | 4/2007 | Faranda | |
| 7,279,635 B2 | 10/2007 | Hyde | |
| 7,365,964 B2 | 4/2008 | Donahue, IV | |
| 7,728,226 B2 | 6/2010 | Drane et al. | |
| 7,756,268 B2 * | 7/2010 | Hazani | H01R 13/719 379/413.02 |
| 7,851,704 B2 | 12/2010 | Fitch et al. | |
| 8,067,703 B1 | 11/2011 | Gretz | |
| 8,089,032 B2 | 1/2012 | Beland et al. | |
| 8,229,501 B2 | 7/2012 | Struthers et al. | |
| 8,245,862 B2 | 8/2012 | Gates, II | |
| 8,289,698 B1 | 10/2012 | Walder | |
| 8,360,810 B2 | 1/2013 | Binder | |
| 8,384,241 B2 | 2/2013 | Chen et al. | |
| 8,456,131 B2 | 6/2013 | Bukow | |
| 8,592,703 B2 | 11/2013 | Johnson et al. | |
| 8,759,676 B1 | 6/2014 | Gretz | |
| 2002/0043960 A1 | 4/2002 | Janik | |
| 2005/0109528 A1 | 5/2005 | Mallen | |
| 2005/0150675 A1 | 7/2005 | Pierce | |
| 2007/0227755 A1 | 10/2007 | Wu et al. | |
| 2009/0101386 A1 | 4/2009 | Schoettle | |
| 2010/0124040 A1 | 5/2010 | Diebel et al. | |
| 2012/0092377 A1 | 4/2012 | Stein | |
| 2012/0275107 A1 | 11/2012 | Enomoto et al. | |
| 2013/0057199 A1 | 3/2013 | Langella | |
| 2013/0058012 A1 | 3/2013 | Ballard | |
| 2013/0109253 A1 | 5/2013 | Gammon et al. | |
| 2013/0192868 A1 | 8/2013 | Fransen et al. | |
| 2013/0280956 A1 | 10/2013 | Cheng et al. | |
| 2014/0060878 A1 | 3/2014 | Trojanowski | |
| 2014/0103179 A1 | 4/2014 | Lipke et al. | |
| 2015/0098184 A1 * | 4/2015 | Tsai | G06F 1/1632 361/679.56 |

\* cited by examiner

MODULAR GANG BOX DOCKING SYSTEM FOR COMPUTING DEVICES

RELATED APPLICATIONS

This is a continuation-in-part application of a prior filed and currently pending application having Ser. No. 14/452,048 and a filing date of Aug. 5, 2014.

This application claims priority and is entitled to the priority date of currently pending U.S. non-provisional application Ser. No. 14/452,048, filed on Aug. 5, 2014, which claims priority and is entitled to the filing date of U.S. provisional application Ser. No. 61/898,995, filed on Nov. 1, 2013. The contents of the aforementioned applications are incorporated by reference herein.

BACKGROUND

The subject of this patent application relates generally to docking systems for electronic devices, and more particularly to a modular gang box docking system configured for allowing computing devices to be selectively docked within an existing gang box.

Applicant(s) hereby incorporate herein by reference any and all patents and published patent applications cited or referred to in this application.

By way of background, mobile computing devices—such as smart phones, tablet computers and the like—are becoming increasingly popular for both personal and business use. As these devices have gotten smaller, many have begun to incorporate the use of touchscreen technology to reduce and oftentimes eliminate the need for keyboards and other physical buttons. Additionally, as these devices have become more powerful, they are becoming capable of monitoring and/or controlling more and more types of external or remote devices, such as thermostats, multimedia systems, home alarms, door locks, automobile engines, garage doors, etc. Thus, it is well known to use mobile computing devices as a controller for other devices, in lieu of dedicated controllers (hard-wired or wireless) for each individual device. It is also known to provide wall mounts for removably receiving such mobile computing devices in order to provide consistent and convenient access thereto, as well as to provide a charging means for said computing devices. For example, a mobile computing device that is utilized for controlling the lights in a home might have a wall mount conveniently positioned near the main entrance of the home. However, the installation of such wall mounts often requires significant construction, resulting in the permanent defacement of that part of the wall in which the mount is installed. One solution to this problem involves the installation of such a mount within an existing junction or gang box; thus, eliminating the need to cut additional holes or run additional wiring within a wall or other surface. However, such known solutions require the occupation of an entire gang box, resulting in the loss of whatever electrical outlets, switches or other components had previously occupied the gang box. Thus, there remains a need for a gang box docking system that allows computing devices to be selectively docked within an existing gang box while also allowing one or more other electrical components to also be installed therein.

Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing a modular docking system for being installed adjacent to an at least one additional electrical component within a gang box is disclosed. In at least one embodiment, the system comprises a docking plate engagable with the gang box and configured for removably receiving an at least one mobile computing device. The docking plate provides an at least one elongate mounting aperture sized and positioned for allowing a screw to pass therethrough and be engaged with an at least one free mounting tab of the gang box while also allowing the docking plate to be selectively offset relative to the corresponding mounting tab of the gang box. An at least one component adapter is engagable with one of a pair of opposing component tabs of the at least one electrical component, the at least one component adapter being sized and configured for increasing a height of the electrical component so as to substantially approximate a height of the docking plate. Thus, the system is capable of allowing the at least one additional electrical component to be installed within the gang box adjacent to the docking plate and, thus, the computing device, regardless of the dimensions of the computing device.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings:

FIG. 1A is a detailed view of the section defined by line 1A of FIG. 1;

FIG. 3A is a detailed view of the section defined by line 3A of FIG. 3;

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 1:
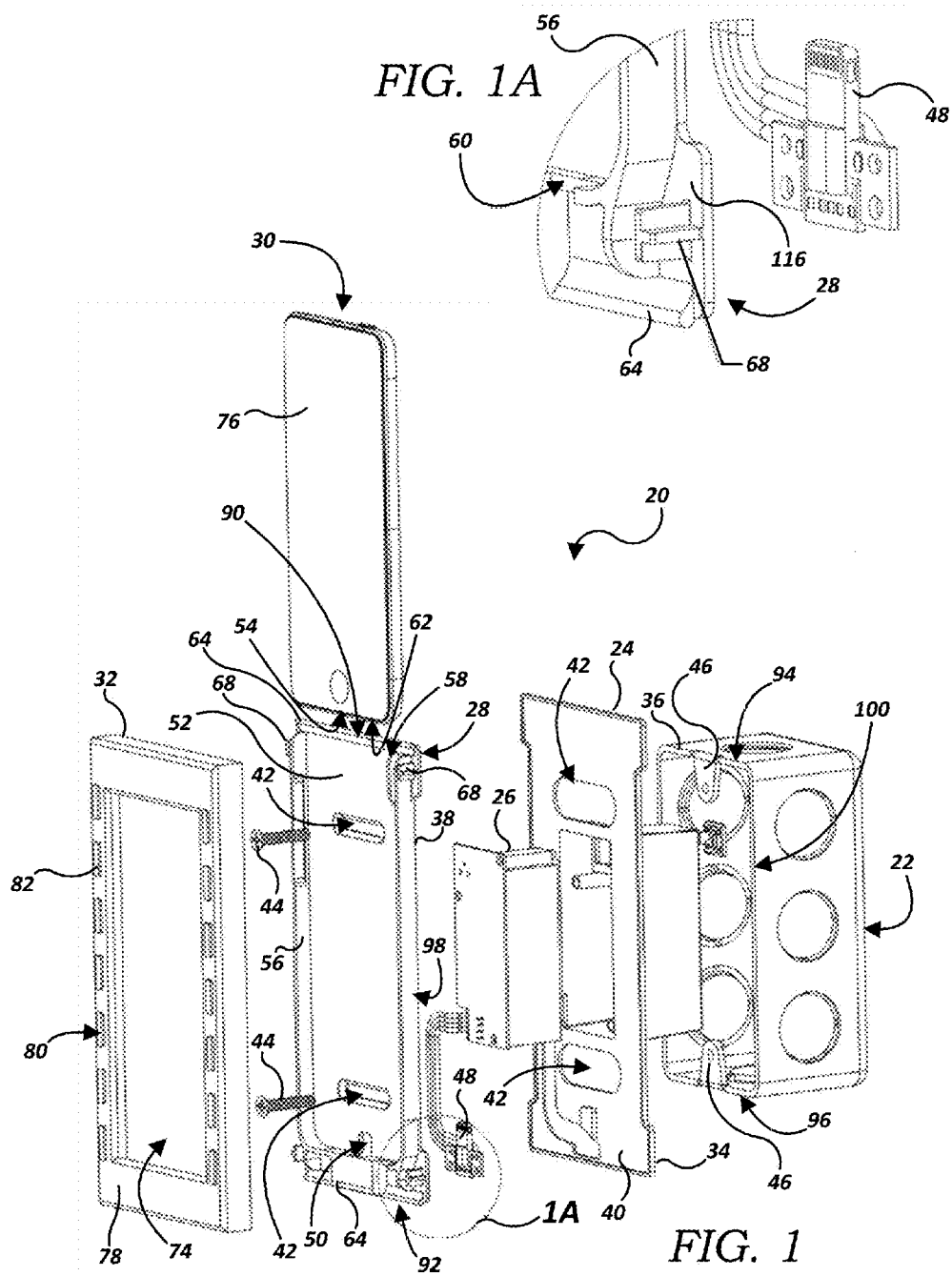
FIG. 1 is an exploded view of an exemplary modular gang box docking system as installed in an exemplary single gang box, in accordance with at least one embodiment.

Turning now to FIG. 1, there is shown an exploded view of an exemplary modular gang box docking system 20 as installed in an exemplary single gang box 22, in accordance with at least one embodiment. At the outset, it should be noted that while the drawings depict the system 20 as utilized in conjunction with each of a single (FIGS. 1 and 1A), double (FIGS. 2, 3 and 3A) and triple (FIGS. 4-7) gang box 22, the system 20 may be utilized in connection with gang boxes 22 of any size, now known or later conceived.

With continued reference to FIG. 1, the system 20 comprises, in the exemplary embodiment, a base plate 24 configured for housing a charging circuit 26 connected to the electrical wires (not shown) provided by the gang box 22, a docking plate 28 configured for removably receiving an at least one mobile (i.e., portable) computing device 30, and a cover plate 32 configured for assisting in retaining the computing device 30 within the docking plate 28. It should be noted that the term "computing device" is intended to include any type of electronic and/or computing device now known or later developed—such as a cellular phone, smartphone, tablet computer, personal data assistant, handheld gaming device, wearable device, music player, etc. —capable of being used in a mobile fashion; though, in at least one embodiment, as discussed further below, the computing device 30 may be configured for being permanently installed within the system 20. Additionally, in at least one embodiment, the computing device 30 may comprise a touchscreen interface and separate processing and/or communication hardware components working in concert with one another either locally or remotely, as discussed further below. As such, the present invention should not be read as being limited to use with any one particular type of computing device 30, even though certain exemplary devices may be mentioned or shown herein for illustrative purposes.

The base plate 24 is configured for removable engagement with the gang box 22, such that a rear surface 34 of the base plate 24 is in abutting contact with a front edge 36 of the gang box 22. Additionally, the docking plate 28 is configured for removable engagement with the base plate 24, such that a rear surface 38 of the docking plate 28 is in abutting contact with a front surface 40 of the base plate 24. In at least one embodiment, each of the docking plate 28 and base plate 24 provides an at least one mounting aperture 42 sized and positioned for allowing a screw 44 to pass through each and be threadably engaged with a free mounting tab 46 of the gang box 22. In this way, the base plate 24 is selectively sandwiched between the docking plate 28 and gang box 22. In at least one such embodiment, shown in FIG. 1, each of the mounting apertures 42 is elongate and horizontally oriented for allowing the docking plate 28 and base plate 24 to be selectively horizontally offset relative to the mounting tabs 46 of the gang box 22, the importance of which is discussed further below in connection with larger gang boxes 22. In alternate embodiments, each of the base plate 24 and docking plate 28 may be removably engaged with one another—and removably engaged with the gang box 22—using any other attachment means now known or later developed. Additionally, in at least one alternate embodiment, the base plate 24 and docking plate 28 are permanently engaged with one another. In a still further alternate embodiment, the base plate 24 and docking plate 28 are one and the same, such that the docking plate 28 is configured for removable engagement with the gang box 22, with the rear surface 38 of the docking plate 28 in abutting contact with the front edge 36 of the gang box 22. In a still further alternate embodiment, where the base plate 24 and docking plate 28 are one and the same, the docking plate 28 is integral with the computing device 30.

In at least one embodiment, an electrical device connector 48 is wired to the charging circuit 26 and extends through a docking aperture 50 in a front surface 52 of the docking plate 28 for allowing selective engagement with a corresponding docking port 54 of the computing device 30. As such, the electrical device connector 48 is capable of providing power to the computing device 30 when docked therewith—either directly powering the computing device 30, or charging an at least one battery of the computing device 30, or both. In at least one embodiment, not shown, the docking plate 28 is configured for simply receiving a touchscreen while the processing and/or communication hardware components—in communication with the touchscreen—are housed elsewhere in the system 20, such as within the charging circuit 26 for example. In such embodiments, the touchscreen is in wired or wireless communication with each of said separate processing and/or communication hardware components.

As mentioned above, in at least one embodiment, the docking plate 28 is configured for removably receiving the computing device 30. In at least one embodiment, the front surface 52 of the docking plate 28 provides a perimeter wall 56 protruding substantially perpendicularly from the front surface 52 of the docking plate 28 and shaped to approximate the dimensions of the computing device 30, such that the computing device 30 may selectively fit snugly therewithin. Preferably, the perimeter wall 56 provides an opening 58 opposite the electrical device connector 48 for allowing the computing device 30 to be slidably inserted within the perimeter wall 56 and engaged with the electrical device connector 48. Additionally, in at least one embodiment, as shown best in detailed view of FIG. 1A, the perimeter wall 56 provides a speaker notch 60 sized and positioned for allowing an at least one speaker 62 of the computing device 30 to remain substantially unobstructed when positioned therewithin. In at least one embodiment, the speaker notch 60 is also positioned and configured for assisting in the selective disengagement of the computing device 30 from within the perimeter wall 56, allowing the computing device 30 to be pushed in a direction substantially away from the electrical device connector 48. In still further embodiments, not shown, the docking plate 28 may provide additional notches or holes positioned and configured for reducing the interference with wireless signals that are sent to and from the computing device 30 while engaged with the docking plate 28. In at least one alternate embodiment, the docking plate 28 may incorporate any other structure or mechanism (or combination thereof)—now known or later developed—capable of allowing the computing device 30 to be removably received by, or otherwise engaged with, the docking plate 28.

With continued reference to FIG. 1, and as mentioned above, the cover plate 32 is configured for assisting in retaining the computing device 30 within the docking plate 28. In at least one embodiment, the cover plate 32 is removably engagable with the front surface 52 of the docking plate 28. In one such embodiment, this removable engagement is achieved via complimentary tongue and groove portions 64 and 66 (FIG. 3) provided by the docking plate 28 and cover plate 32, respectively, such that each tongue portion 64 is capable of selectively indexing into the corresponding groove portion 66 for creating a snap fit between the cover plate 32 and docking plate 28. In alternate embodiments, this removable engagement may be achieved via any other engagement means now known or later developed, such as screws. In still further embodiments, the cover plate 32 may be permanently engaged with the docking plate 28, thereby preventing the computing device 30 from ever being removed.

In at least one embodiment, as shown best in FIG. 1A, the front surface 52 of the docking plate 28 also provides an at least one substantially perpendicularly oriented positioning post 68 sized and configured for being removably positioned within a corresponding substantially perpendicularly oriented positioning guide 70 (FIG. 3) provided by a rear surface 72 of the cover plate 32. In this way, the at least one positioning post 68 and positioning guide 70 assist in appropriately positioning the cover plate 32 relative to the docking plate 28 when engaged therewith.

In at least one embodiment, the cover plate 32 also provides an at least one device aperture 74 sized and configured for allowing at least a screen 76 of the computing device 30 to be viewable and accessible therethrough when engaged with the docking plate 28. Given that the system 20 is capable of being used in connection with a wide range of computing devices 30, the particular dimensions of the device aperture 74 may vary depending on the dimensions of the specific computing device 30 to be engaged with the docking plate 28 in any given embodiment.

Figure 2:
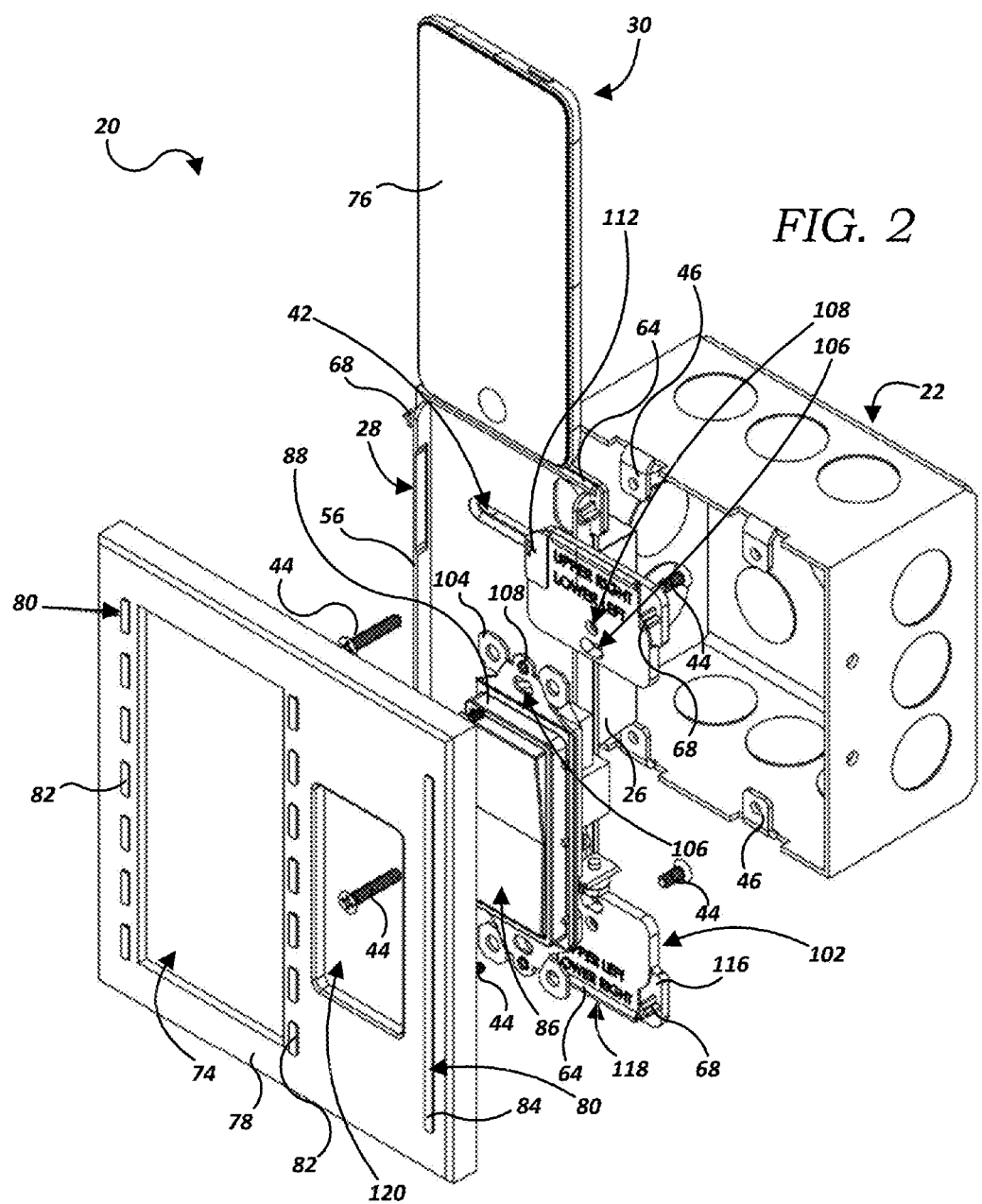
FIGS. 2 and 3 are exploded views of a further exemplary modular gang box docking system as installed in an exemplary double gang box, in accordance with at least one embodiment.

As shown in FIGS. 1 and 2, in at least one embodiment, a front surface 78 of the cover plate 32 provides an at least one input control 80 in communication with the computing device 30 and configured for causing the computing device 30—via software or firmware installed on the computing device 30—to carry out one or more pre-defined functions, such as turning on a light, adjusting the volume on a sound system, opening a garage door, etc. In at least one such embodiment, the at least one input control 80 is a physical button 82. In another such embodiment, the at least input control 80 is a capacitive slider 84. In still further embodiments, the at least one input control 80 is any other type of input control (or combination of input controls) now known or later developed—including but not limited to physical buttons 82, capacitive buttons, physical sliders, capacitive sliders 84, knobs, switches, etc.—capable of generating a signal for causing the computing device 30 to carry out one or more pre-defined functions. In at least one embodiment, the pre-defined functions associated with each input control 80 may be selectively customized. It should be noted that the means for allowing communication between each of the at least one input control 80 and the computing device 30, along with any separate devices that the computing device 30 is configured to selectively control or monitor, may be any wired- or wireless-based communication protocol (or combination of protocols) now known or later developed. As such, the present invention should not be read as being limited to any particular type of communication protocol, even though certain exemplary protocols may be mentioned herein for illustrative purposes. In at least one embodiment, each of the at least one input control 80 is powered by the charging circuit 26. In one such embodiment, appropriate electrical current is capable of traveling from the charging circuit 26 to at least one of the positioning posts 68 of the docking plate 28, to the corresponding at least one of the positioning guides 70 of the cover plate 32 (when the cover plate 32 is engaged with the docking plate 28), to the at least one input control 80. In another embodiment, each of the at least one input control 80 is powered by a battery (not shown) positioned in one of the cover plate 32, docking plate 28, base plate 24 or gang box 22. In still further embodiments, the at least one input control 80 may be powered by any other means now known or later developed. Additionally, in embodiments where there exists such electrical communication between the at least one input control 80 and at least one of the positioning posts 68 of the docking plate 28, this electrical communication may be used as a means for transmitting signals to the computing device 30 for causing the computing device 30 to carry out the appropriate pre-defined functions as described above. Similarly, in embodiments where the docking plate 28 is configured for receiving a touchscreen while the processing and/or communication hardware components—in communication with the touchscreen—are housed elsewhere in the system 20, this electrical communication may be used as a means for transmitting signals between each of the touchscreen, at least one input control 80 and said separate hardware components.

Figure 3:
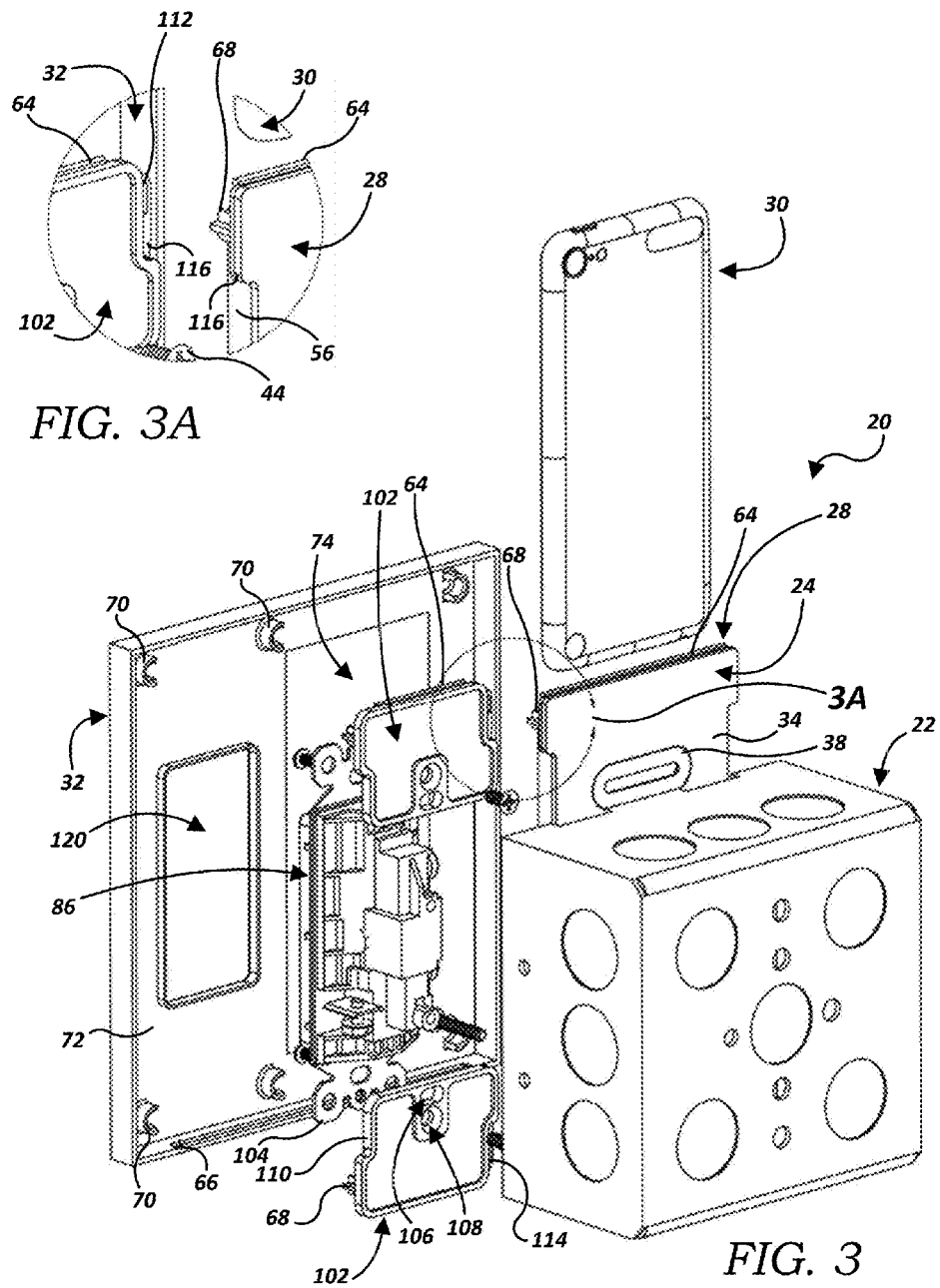
Figure 4:
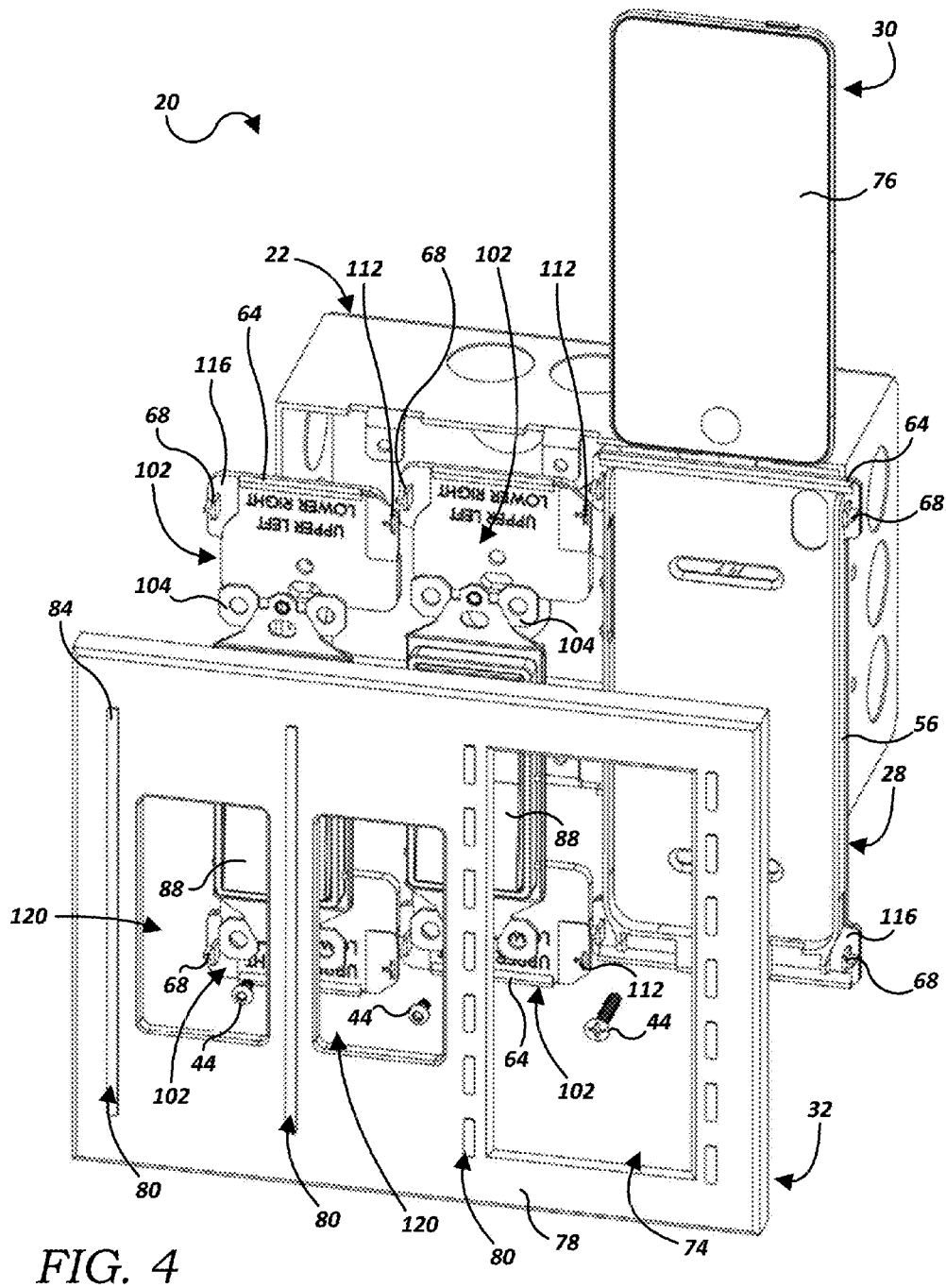
FIG. 4 is an exploded view of a further exemplary modular gang box docking system as installed in an exemplary triple gang box, in accordance with at least one embodiment.
Figure 5:
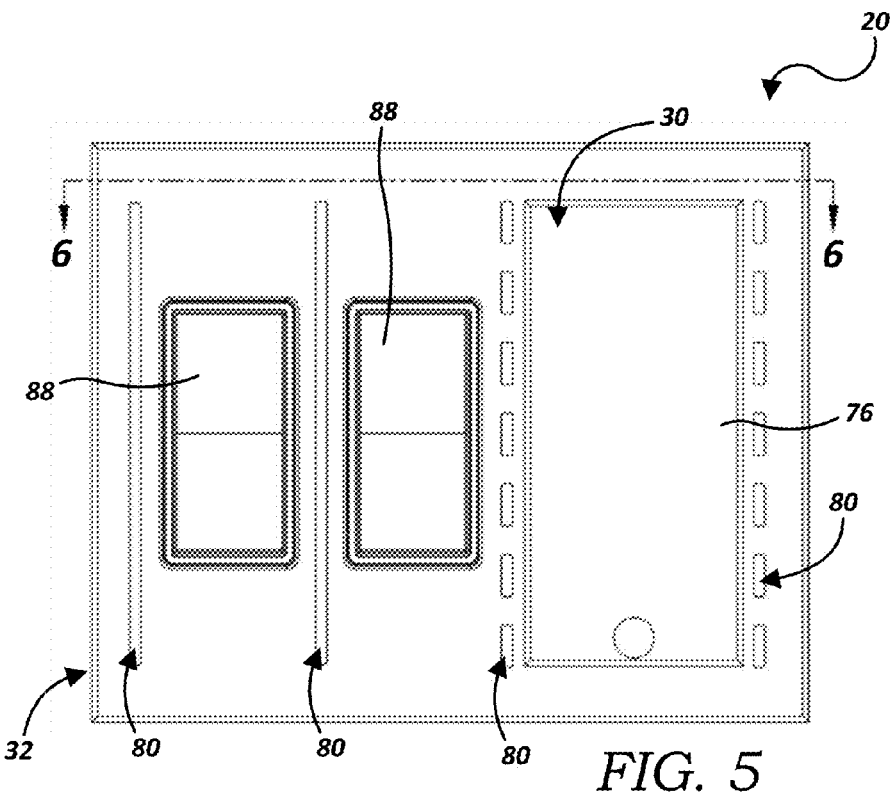
FIG. 5 is a front elevational view thereof.

As mentioned above, the system 20 may be utilized in connection with gang boxes 22 of any size, now known or later conceived. Thus, FIGS. 2 and 3 illustrate an exemplary embodiment of the system 20 as installed in an exemplary double gang box 22, while FIGS. 4-7 illustrate another exemplary embodiment of the system 20 as installed in an exemplary triple gang box 22. In one such embodiment, not shown, each of the base plate 24, docking plate 28 and cover plate 32 are sized and configured for spanning the entire double or triple gang box 22 while accommodating a single computing device 30. Preferably, though, where the size of the gang box 22 permits (i.e., where the dimensions of the computing device 30 is smaller than the dimensions of the gang box 22), the system 20 allows additional electrical components 86 to be installed adjacent to the computing device 30—including one or more additional computing devices 30 (not shown). In at least one such embodiment, shown in FIGS. 2-7, the system 20 incorporates an at least one traditional switch 88. It should be noted that while switches 88 are shown and described herein as exemplary additional electrical components 86, any other types of electrical components 86 now known or later developed—such as electrical outlets, phone jacks, Ethernet ports, coaxial cable ports, dimmer knobs or sliders, etc.—may be incorporated in further embodiments.

In a bit more detail, and with continued reference to FIGS. 2-7, each of the base plate 24 and docking plate 28 are sized for approximating the dimensions of the computing device 30 in at least one embodiment. In this way, the base plate 24 and docking plate 28 are sized for allowing the at least one additional electrical component 86 (such as the switch 88) to be positioned adjacent the docking plate 28 within the gang box 22 in a side-by-side arrangement. Given that the dimensions of many computing devices 30 (or at least the height) are larger than the dimensions of traditional gang boxes 22, top and bottom edges 90 and 92 of at least the docking plate 28 extend beyond top and bottom edges 94 and 96 of the gang box 22 in at least one embodiment. In at least one further embodiment, depending on the dimensions of the computing device 30, an outer lateral edge 98 of at least the docking plate 28 extends beyond the corresponding lateral edge 100 of the gang box 22 as well. As a result, in such embodiments, the dimensions of the cover plate 32 are relatively larger than the dimensions (namely, the height) of the at least one additional electrical component 86.

Figure 6:
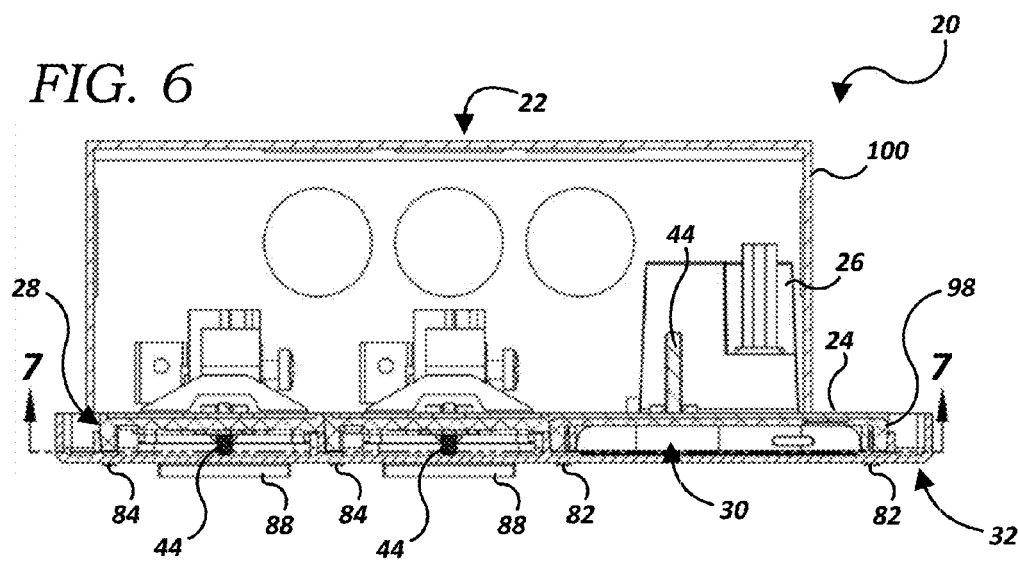
FIG. 6 is a cross-sectional view taken along line 6-6 of FIG. 5.
Figure 7:
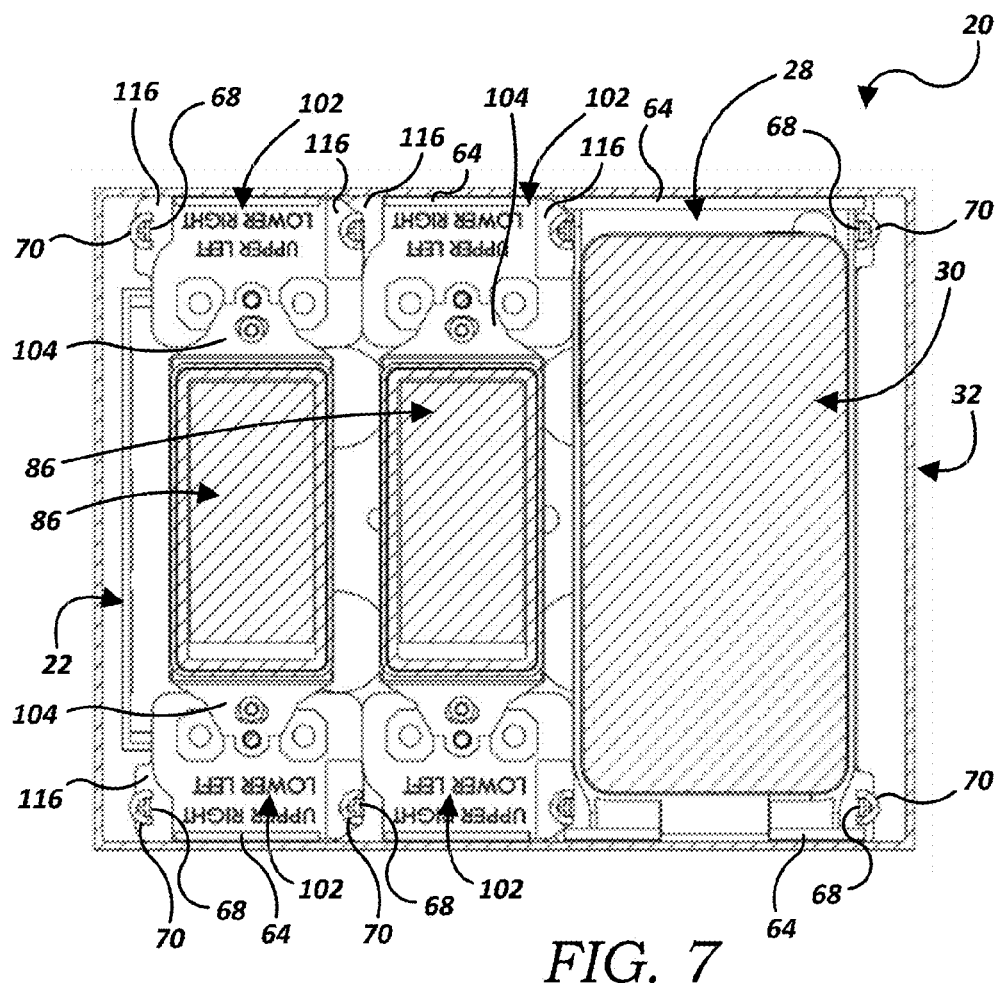
FIG. 7 is a cross-sectional view taken along line 7-7 of FIG. 6.

To compensate for this, the system 20 provides, in at least one embodiment, an at least one component adapter 102 sized and configured for being engaged with one of a pair of opposing component tabs 104 of the electrical component 86 for increasing the height of the electrical component 86 in order to approximate or equal the height of the docking plate 28, as shown best in FIG. 7. In a bit more detail, each of the component adapter 102 and corresponding component tab 104 provides an at least one mounting aperture 106 sized and positioned for allowing a screw 44 to pass through each and be threadably engaged with a free mounting tab 46 of the gang box 22. As illustrated best in FIG. 6, with the at least one electrical component 86 so mounted within the gang box 22, the elongate, horizontally oriented mounting apertures 42 of the docking plate 28 and base plate 32 allow them to be mounted within the gang box 22 as well—regardless of the width of the docking plate 28 and base plate 24 (and, hence, the computing device 30)—since they are capable of being selectively horizontally offset relative to the mounting tabs 46 of the gang box 22 as needed. In at least one further such embodiment, each of the component adapter 102 and corresponding component tab 104 also provides an at least one engagement aperture 108 sized and configured for allowing a screw 44 to pass through each for removably securing the component adapter 102 to the component tab 104. Additionally, in at least one embodiment, each component adapter 102 provides an at least one substantially perpendicularly oriented positioning post 68 sized and configured for being removably positioned within a corresponding one of the positioning guides 70 (FIG. 3) provided by the rear surface 72 of the cover plate 32, similar to the at least one positioning post 68 provided by the front surface 52 of the docking plate 28. In this way, the at least one positioning post 68 of each of the docking plate 28 and at least one component adapter 102 assist in appropriately positioning the cover plate 32 relative to the docking plate 28 and at least one component adapter 102 when engaged with the positioning guides 70.

In the exemplary embodiment, each component adapter 102 provides at least one positioning post 68 proximal a first lateral edge 110 thereof, along with an at least one positioning aperture 112 proximal an opposing second lateral edge 114 thereof. The at least one positioning aperture 112 is sized and configured for receiving one of the positioning posts 68 of either the docking plate 28 or another component adapter 102 therethrough. Additionally, each of the opposing component tabs 104 of a given electrical component 86 is preferably engaged with a component adapter 102. In this way, the docking plate 28 and one or more electrical components 86 may be positioned in a side-by-side arrangement within the gang box 22 while the corresponding positioning posts 68 and positioning apertures 112 engage one another for maintaining the alignment and respective positions of each of the docking plate 28 and one or more electrical components 86 relative to the cover plate 32. In at least one such embodiment, as shown best in FIG. 3A, the portions of each component adapter 102 on which the respective positioning posts 68 and positioning apertures 112 are located, as well as the portions of the docking plate 28 on which the at least one positioning post 68 is located, are configured for being complementary keyed surfaces 116 so as to maintain a substantially uniform thickness across two or more component adapters 102 and/or the docking plate 28 when they are removably engaged with one another, as illustrated in FIG. 6. In an alternate embodiment, the at least one component adapter 102 may be omitted altogether.

With the docking plate 28 and component adapters 102 of the at least one electrical component 86 so engaged, both with one another as well as the gang box 22 as described above, the cover plate 32 may be removably engaged with both the docking plate 28 and at least one electrical component 86 such that the positioning posts 68 of each are removably positioned within the corresponding positioning guides 70 on the rear surface 72 of the cover plate 32, as shown best in FIG. 7. In one such embodiment, similar to the tongue portion 64 provided by the docking plate 28, a free edge 118 of each component adapter 102 also provides a tongue portion 64 capable of selectively indexing into the corresponding groove portion 66 provided by the cover plate 32 for creating a snap fit therebetween. In alternate embodiments, this removable engagement may be achieved via any other engagement means now known or later developed, such as screws. In still further embodiments, the cover plate 32 may be permanently engaged with the docking plate 28 and at least one component adapter 102, thereby preventing the computing device 30 from being removed.

In at least one embodiment, the cover plate 32 also provides an at least one component aperture 120 sized and configured for allowing the at least one electrical component 86 to be accessible therethrough when engaged with the corresponding at least one component adapter 102. Given that the system 20 is capable of being used in connection with a wide range of electrical components 86, the particular dimensions of each component aperture 102 may vary depending on the dimensions of the specific electrical components 86 to be mounted within the gang box 22 in any given embodiment.

It should be noted that while the cover plates 32 shown in the drawings are of unitary construction, in at least one further embodiment, each of the docking plate 28 and at least one electronic component 86 has a separate modular cover plate portion (not shown); each of the modular cover plate portions being selectively positionable in a side-by-side arrangement by virtue of at least the positioning posts 68 and positioning guides 70. In this way, the relative positions of the docking plate 28 and at least one electronic component 86 within the gang box 22 are capable of being selectively rearranged with greater ease.

In at least one embodiment, the system 20 provides a device case 122 sized for approximating the dimensions of the computing device 30 and configured for receiving the computing device 30 therewithin. Accordingly, in at least one such embodiment, a rear surface 124 of the device case 122 is configured for removable engagement with the front surface 52 of the docking plate 28. To achieve this removable engagement, in at least one embodiment, the docking plate 28 provides an at least one magnet positioned for removably engaging a corresponding at least one magnet that is positioned on the device case 122. Alternatively, at least a portion of the device case 122 may be constructed of metal for allowing the device case 122 to be removably engaged with the at least one magnet on the docking plate 28. In at least one further embodiment, the docking plate 28 may incorporate any other structure or mechanism (or combination thereof)—now known or later developed— capable of allowing the device case 122 to be removably received by, or otherwise engaged with, the docking plate 28. In at least one embodiment, the electrical device connector 48 is positioned within the device case 122, such that the electrical device connector 48 engages the docking port 54 of the computing device 30 when the computing device 30 is positioned within the device case 122. In at least one such embodiment, rather than the electrical device connector 48 being wired to the charging circuit 26, the electrical device connector 48 is instead configured for being selectively interconnected with the charging circuit 26.

In a bit more detail, in at least one embodiment, the front surface 52 of the docking plate 28 provides an at least one docking contact 126 positioned and configured for selectively contacting a corresponding case contact 128 positioned on the rear surface 124 of the device case 122 when the device case 122 is engaged with the docking plate 28.

The docking contact 126 is in electrical communication with the charging circuit 26, and the case contact 128 is in electrical communication with the electrical device connector 48. Accordingly, when the device case 122 is engaged with the docking plate 28, the computing device 30 is able to receive power from the charging circuit 26. Additionally, in at least one embodiment, where the docking plate 28 is configured for receiving a touchscreen while the processing and/or communication hardware components—in communication with the touchscreen—are housed elsewhere in the system 20, this electrical communication may be used as a means for transmitting signals between each of the touchscreen and said separate hardware components. In at least one alternate embodiment, the docking contact 126 and case contact 128 may utilize induction. In still further embodiments, the transmission of electricity between the docking contact 126 and case contact 128 may be achieved using any other mechanism or method (or combination thereof), now known or later developed.

Figure 8:
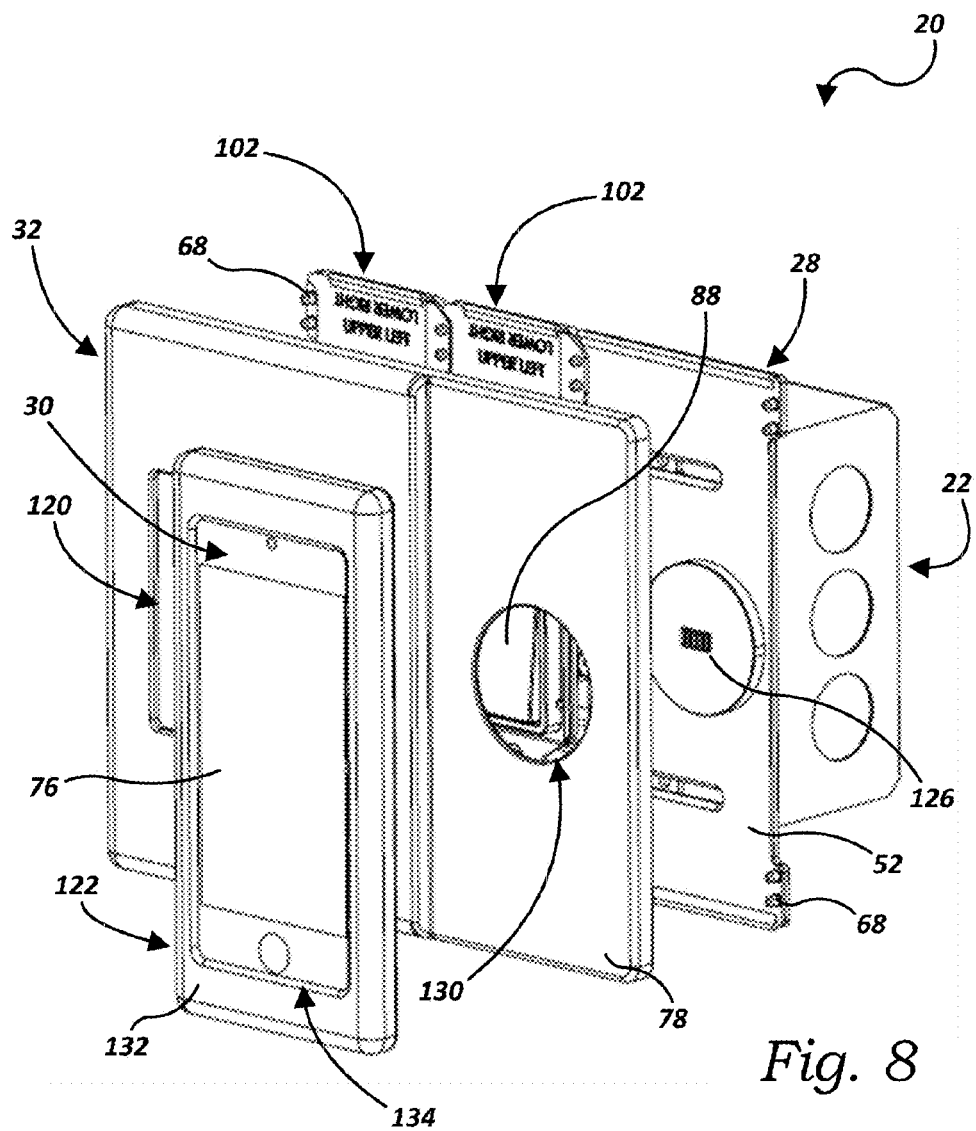
FIGS. 8 and 9 are exploded views of a further exemplary modular gang box docking system as installed in an exemplary triple gang box, in accordance with at least one embodiment.
Figure 9:
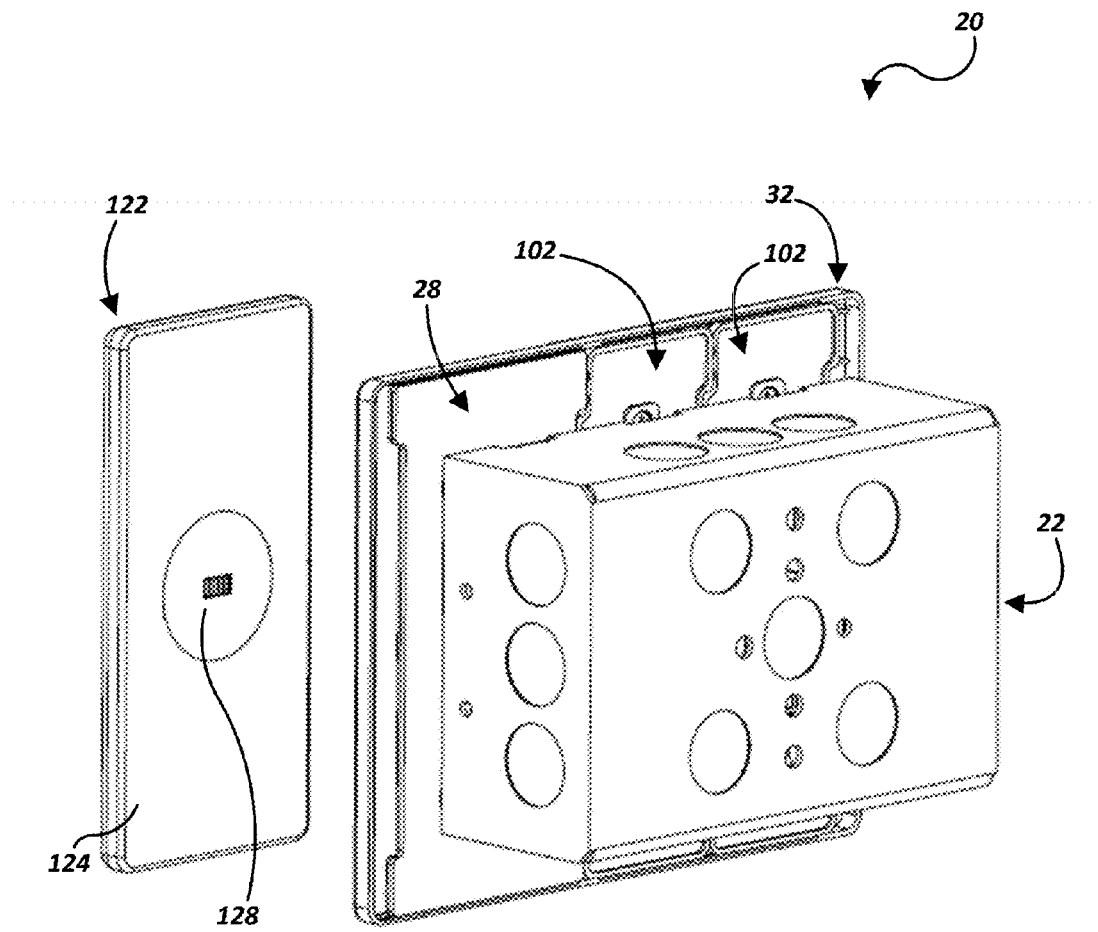

In at least one alternate embodiment, as illustrated in FIGS. 8 and 9, in addition to being removably engagable with the front surface 52 of the docking plate 28, the rear surface 124 of the device case 122 is further configured for removable engagement with the front surface 78 of the cover plate 32. Similar to the above described embodiments, in at least one such embodiment, the cover plate 32 provides an at least one magnet positioned for removably engaging a corresponding at least one magnet that is positioned on the device case 122. Alternatively, at least a portion of the device case 122 may be constructed of metal for allowing the device case 122 to be removably engaged with the at least one magnet on the cover plate 32. In at least one further embodiment, the cover plate 32 may incorporate any other structure or mechanism (or combination thereof)—now known or later developed—capable of allowing the device case 122 to be removably received by, or otherwise engaged with, the cover plate 32. In at least one embodiment, the cover plate 32 provides an at least one contact aperture 130 positioned and configured for allowing the docking contact 126 of the docking plate 28 to extend therethrough, thereby allowing the docking contact 126 and case contact 128 to be positioned in electrical contact with one another when the device case 122 is engaged with the cover plate 32. In at least one embodiment, the docking contact 126 provides an at least one magnet positioned for removably engaging a corresponding at least one magnet that is positioned on the case contact 128. Alternatively, at least a portion of the case contact 128 may be constructed of metal for allowing the case contact 128 to be removably engaged with the at least one magnet on the docking contact 126. In a further alternate embodiment, the at least one docking contact 126 is positioned on the cover plate 32.

In at least one embodiment, a front surface 132 of the device case 122 provides an at least one case aperture 134 sized and configured for allowing at least the screen 76 of the computing device 30 to be viewable and accessible therethrough when positioned within the device case 122. Again, given that the system 20 is capable of being used in connection with a wide range of computing devices 30, the particular dimensions of the case aperture 134 may vary depending on the dimensions of the specific computing device 30 to be positioned within the device case 122 in any given embodiment.

It should also be noted that while the docking plate 28 and computing device 30 are shown in a vertical (i.e., portrait) orientation in the drawings, in at least one further embodiment, the docking plate 28 may be configured for receiving and retaining the computing device 30 in a horizontal (i.e., landscape) orientation instead, with the device aperture 74 in the cover plate 32 appropriately oriented as well.

Aspects of the present specification may also be described as follows:

1. A modular docking system for being installed adjacent to an at least one additional electrical component within a gang box, the system comprising: a docking plate engaging a front edge of the gang box and configured for receiving an at least one computing device; the docking plate providing an at least one elongate mounting aperture sized and positioned for allowing a screw to pass therethrough and be engaged with an at least one free mounting tab on the front edge of the gang box while also allowing the docking plate to be selectively offset relative to the corresponding mounting tab of the gang box; a charging circuit in electrical communication with an at least one electrical wire provided by the gang box, the charging circuit selectively providing power to the at least one computing device; and an at least one component adapter engaging one of a pair of opposing component tabs of the at least one electrical component, the at least one component adapter sized for increasing a height of said electrical component so as to substantially-approximate a height of the docking plate; whereby, the system allows the at least one additional electrical component to be installed within the gang box adjacent to the docking plate and, thus, the computing device, regardless of the dimensions of the computing device.

2. The modular docking system according to embodiment 1, further comprising a cover plate engaging a front surface of the docking plate, covering a perimeter of the computing device, and assisting in maintaining the engagement between the computing device and the docking plate.

3. The modular docking system according to embodiments 1-2, wherein the docking plate and the cover plate provide complimentary tongue portions and groove portions, whereby each of said tongue portions selectively indexes into a corresponding one of said groove portions for creating a snap fit between the docking plate and cover plate.

4. The modular docking system according to embodiments 1-3, wherein the at least one component adapter and the cover plate provide complimentary tongue portions and groove portions, whereby each of said tongue portions selectively indexes into a corresponding one of said groove portions for creating a snap fit between the at least one component adapter and the cover plate.

5. The modular docking system according to embodiments 1-4, further comprising: an at least one substantially perpendicularly oriented first positioning post positioned on the front surface of the docking plate; and an at least one substantially perpendicularly oriented positioning guide positioned on a rear surface of the cover plate for removably receiving a corresponding one of the at least one first positioning post; whereby, the at least one first positioning post and positioning guide assist in appropriately positioning the cover plate relative to the docking plate when engaged therewith.

6. The modular docking system according to embodiments 1-5, wherein each of the at least one component adapter provides an at least one substantially perpendicularly oriented second positioning post sized and being removably positioned within a corresponding one of the positioning guides on the rear surface of the cover plate, whereby, the at least one first positioning post and second positioning post assist in appropriately positioning the cover plate relative to the docking plate and at least one component adapter when engaged therewith.

7. The modular docking system according to embodiments 1-6, wherein each of the at least one component adapter provides at least one second positioning post proximal a first lateral edge thereof, along with an at least one positioning aperture proximal an opposing second lateral edge thereof, said positioning aperture positioned and receiving a one of the at least one first positioning post of the docking plate or second positioning post of a further adjacent component adapter therethrough, whereby, with the docking plate and at least one component adapter of the at least one electrical component so engaged, the docking plate and at least one electrical component may be positioned in an adjacent arrangement within the gang box while the corresponding first and second positioning posts and positioning apertures engage one another for maintaining the alignment and respective positions of each of the docking plate and at least one electrical component relative to the cover plate.

8. The modular docking system according to embodiments 1-7, wherein at least a portion of the first lateral edge of each of the at least one component adapter and at least a portion of the second lateral edge of each of the at least one component adapter each provides a complimentary keyed surface so as to maintain a generally uniform thickness when the positioning aperture of said component adapter is engaged with the second positioning post of one of another of said at least one component adapter or the first positioning post of the docking plate.

9. The modular docking system according to embodiments 1-8, wherein a front surface of the cover plate provides an at least one input control in communication with the computing device and causing the computing device to carry out an at least one pre-defined function.

10. The modular docking system according to embodiments 1-9, further comprising an electrical device connector in selective electrical communication with the charging circuit and positioned for allowing selective electrical communication with a corresponding docking port of the at least one computing device for providing power to said computing device when engaged therewith.

11. The modular docking system according to embodiments 1-10, further comprising: a device case sized for approximating the dimensions of the computing device and configured for receiving the computing device therewithin, a rear surface of the device case configured for removable engagement with the front surface of the docking plate; the electrical device connector positioned within the device case, such that the electrical device connector engages the docking port of the computing device when the computing device is positioned within the device case; the rear surface of the device case providing an at least one case contact in electrical communication with the electrical device connector; the front surface of the docking plate providing an at least one docking contact in electrical communication with the charging circuit; and each of the at least one case contact positioned for selectively contacting a corresponding one of the at least one docking contact when the device case is engaged with the docking plate; whereby, when the device case is engaged with the docking plate, the computing device is able to receive power from the charging circuit.

12. The modular docking system according to embodiments 1-11, wherein: the rear surface of the device case is further configured for removable engagement with the front surface of the cover plate; and the cover plate provides an at least one contact aperture positioned and configured for allowing the at least one docking contact to extend therethrough, thereby allowing the at least one docking contact and corresponding at least one case contact to be positioned in selective contact with one another with the device case is engaged with the cover plate.

13. The modular docking system according to embodiments 1-12, wherein the electrical device connector extends through a docking aperture in the front surface of the docking plate.

14. The modular docking system according to embodiments 1-13, wherein the front surface of the docking plate provides a perimeter wall protruding substantially perpendicularly from the front surface of the docking plate, the perimeter wall shaped to approximate the dimensions of the computing device.

15. The modular docking system according to embodiments 1-14, wherein the perimeter wall provides an opening opposite the electrical device connector for allowing the computing device to be slidably inserted within the perimeter wall and engaged with the electrical device connector.

16. The modular docking system according to embodiments 1-15, wherein the perimeter wall provides a speaker notch sized and positioned for allowing an at least one speaker of the computing device to remain generally unobstructed when the computing device is positioned within the perimeter wall.

17. The modular docking system according to embodiments 1-16, further comprising a base plate, a rear surface of the base plate engaging the front edge of the gang box, with a rear surface of the docking plate engaging a front surface of the base plate.

18. The modular docking system according to embodiments 1-17, wherein the charging circuit is positioned on the base plate.

19. The modular docking system according to embodiments 1-18, wherein the base plate provides an at least one elongate mounting aperture sized and positioned for allowing a screw to pass through said mounting apertures of each of the base plate and docking plate and be threadably engaged with the at least one free mounting tab of the gang box while also allowing the docking plate and base plate to be selectively offset relative to the corresponding mounting tab of the gang box.

20. The modular docking system according to embodiments 1-19, wherein each of the at least one component adapter and corresponding component tab of the at least one electrical component provides an at least one mounting aperture sized and positioned for allowing a screw to pass therethrough and be threadably engaged with a free mounting tab of the gang box.

21. The modular docking system according to embodiments 1-20, wherein each of the at least one component adapter and corresponding component tab of the at least one electrical component provides an at least one engagement aperture sized and allowing a screw to pass therethrough for removably securing said component adapter to said component tab.

22. A modular docking system for being installed adjacent to an at least one additional electrical component within a gang box, the system comprising: a docking plate engaging a front edge of the gang box and providing a perimeter wall protruding substantially perpendicularly from a front surface of the docking plate for receiving an at least one computing device therewithin; the docking plate further providing an at least one elongate mounting aperture sized and positioned for allowing a screw to pass therethrough and be engaged with an at least one free mounting tab on the front edge of the gang box while also allowing the docking plate to be selectively offset relative to the corresponding mounting tab of the gang box; a charging circuit in electrical communication with an at least one electrical wire provided by the gang box, the charging circuit selectively providing power to the at least one computing device; a cover plate engaging the front surface of the docking plate, covering a perimeter of the computing device, and assisting in retaining the computing device within the docking plate; and an at least one component adapter engaging one of a pair of opposing component tabs of the at least one electrical component, the at least one component adapter sized for increasing a height of said electrical component so as to substantially—approximate a height of the docking plate; whereby, the system allows the at least one additional electrical component to be installed within the gang box adjacent to the docking plate and, thus, the computing device, regardless of the dimensions of the computing device.

23. A modular docking system for being installed adjacent to an at least one additional electrical component within a gang box, the system comprising: a device case sized for approximating the dimensions of a computing device and configured for receiving the computing device therewithin; a docking plate engaging a front edge of the gang box and configured for receiving the device case; the docking plate providing an at least one elongate mounting aperture sized and positioned for allowing a screw to pass therethrough and be engaged with an at least one free mounting tab on the front edge of the gang box while also allowing the docking plate to be selectively offset relative to the corresponding mounting tab of the gang box; a charging circuit in electrical communication with an at least one electrical wire provided by the gang box; an electrical device connector positioned within the device case such that the electrical device connector engages a corresponding docking port of the computing device when the computing device is positioned within the device case; a rear surface of the device case providing an at least one case contact in electrical communication with the electrical device connector; a front surface of the docking plate providing an at least one docking contact in electrical communication with the charging circuit; each of the at least one case contact positioned for selectively contacting a corresponding one of the at least one docking contact when the device case is engaged with the docking plate, thereby allowing the charging circuit to provide power to the computing device; and an at least one component adapter engaging one of a pair of opposing component tabs of the at least one electrical component, the at least one component adapter sized for increasing a height of said electrical component so as to substantially-approximate a height of the docking plate; whereby, the system allows the at least one additional electrical component to be installed within the gang box adjacent to the docking plate and, thus, the computing device, regardless of the dimensions of the computing device.

In closing, regarding the exemplary embodiments of the present invention as shown and described herein, it will be appreciated that a modular gang box docking system is disclosed and configured for allowing computing devices to be selectively docked within an existing gang box while also allowing one or more other electrical components to also be installed therein. Because the principles of the invention may be practiced in a number of configurations beyond those shown and described, it is to be understood that the invention is not in any way limited by the exemplary embodiments, but is generally directed to a modular gang box docking system and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention. Furthermore, the various features of each of the above-described embodiments may be combined in any logical manner and are intended to be included within the scope of the present invention.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

The terms "a," "an," "the" and similar referents used in the context of describing the present invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the present invention so claimed are inherently or expressly described and enabled herein.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may comprise one or more modules that execute on one or more processors in a distributed, non-distributed, or multiprocessing environment.

The methods as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A modular docking system for being installed adjacent to an at least one additional electrical component within a gang box, the system comprising:
    a docking plate engaging a front edge of the gang box and removably retaining an at least one computing device;
    the docking plate providing an at least one elongate mounting aperture sized and positioned for allowing a screw to pass therethrough and be engaged with an at least one free mounting tab on the front edge of the gang box while also allowing the docking plate to be selectively offset relative to the corresponding mounting tab of the gang box; a charging circuit in electrical communication with an at least one electrical wire provided by the gang box, the charging circuit selectively providing power to the at least one computing device; and
    an at least one component adapter engaging one of a pair of opposing component tabs of the at least one electrical component, the at least one component adapter sized for increasing a height of said electrical component so as to approximate a height of the docking plate; whereby, the system allows the at least one additional electrical component to be installed within the gang box adjacent to the docking plate and, thus, the computing device, regardless of the dimensions of the computing device.

2. The modular docking system of claim 1, further comprising a cover plate engaging a front surface of the docking plate, covering a perimeter of the computing device, and assisting in maintaining the engagement between the computing device and the docking plate.

3. The modular docking system of claim 2, wherein the docking plate and the cover plate provide complimentary tongue portions and groove portions, whereby each of said tongue portions selectively indexes into a corresponding one of said groove portions for creating a snap fit between the docking plate and cover plate.

4. The modular docking system of claim 2, wherein the at least one component adapter and the cover plate provide complimentary tongue portions and groove portions, whereby each of said tongue portions selectively indexes into a corresponding one of said groove portions for creating a snap fit between the at least one component adapter and the cover plate.

5. The modular docking system of claim 2, further comprising:
    an at least one substantially perpendicularly oriented first positioning post positioned on the front surface of the docking plate; and
    an at least one substantially perpendicularly oriented positioning guide positioned on a rear surface of the cover plate for removably receiving a corresponding one of the at least one first positioning post;
    whereby, the at least one first positioning post and positioning guide assist in appropriately positioning the cover plate relative to the docking plate when engaged therewith.

6. The modular docking system of claim 5, wherein each of the at least one component adapter provides an at least one substantially perpendicularly oriented second positioning post sized and being removably positioned within a corresponding one of the positioning guides on the rear surface of the cover plate, whereby, the at least one first positioning post and second positioning post assist in appropriately positioning the cover plate relative to the docking plate and at least one component adapter when engaged therewith.

7. The modular docking system of claim 6, wherein each of the at least one component adapter provides at least one second positioning post proximal a first lateral edge thereof, along with an at least one positioning aperture proximal an opposing second lateral edge thereof, said positioning aperture positioned and receiving a one of the at least one first positioning post of the docking plate or second positioning post of a further adjacent component adapter therethrough, whereby, with the docking plate and at least one component adapter of the at least one electrical component so engaged, the docking plate and at least one electrical component may be positioned in an adjacent arrangement within the gang box while the corresponding first and second positioning posts and positioning apertures engage one another for maintaining the alignment and respective positions of each of the docking plate and at least one electrical component relative to the cover plate.

8. The modular docking system of claim 7, wherein at least a portion of the first lateral edge of each of the at least one component adapter and at least a portion of the second lateral edge of each of the at least one component adapter each provides a complimentary keyed surface so as to maintain a generally uniform thickness when the positioning aperture of said component adapter is engaged with the second positioning post of one of another of said at least one component adapter or the first positioning post of the docking plate.

9. The modular docking system of claim 2, wherein a front surface of the cover plate provides an at least one input control in communication with the computing device and causing the computing device to carry out an at least one pre-defined function.

10. The modular docking system of claim 2, further comprising an electrical device connector in selective electrical communication with the charging circuit and positioned for allowing selective electrical communication with a corresponding docking port of the at least one computing device for providing power to said computing device when engaged therewith.

11. The modular docking system of claim 10, further comprising:
 a device case sized for approximating the dimensions of the computing device and configured for receiving the computing device therewithin, a rear surface of the device case configured for removable engagement with the front surface of the docking plate;
 the electrical device connector positioned within the device case, such that the electrical device connector engages the docking port of the computing device when the computing device is positioned within the device case;
 the rear surface of the device case providing an at least one case contact in electrical communication with the electrical device connector;
 the front surface of the docking plate providing an at least one docking contact in electrical communication with the charging circuit; and
 each of the at least one case contact positioned for selectively contacting a corresponding one of the at least one docking contact when the device case is engaged with the docking plate;
 whereby, when the device case is engaged with the docking plate, the computing device is able to receive power from the charging circuit.

12. The modular docking system of claim 11, wherein:
 the rear surface of the device case is further configured for removable engagement with the front surface of the cover plate; and
 the cover plate provides an at least one contact aperture positioned and configured for allowing the at least one docking contact to extend therethrough, thereby allowing the at least one docking contact and corresponding at least one case contact to be positioned in selective contact with one another with the device case is engaged with the cover plate.

13. The modular docking system of claim 10, wherein the electrical device connector extends through a docking aperture in the front surface of the docking plate.

14. The modular docking system of claim 13, wherein the front surface of the docking plate provides a perimeter wall protruding substantially perpendicularly from the front surface of the docking plate, the perimeter wall shaped to approximate the dimensions of the computing device.

15. The modular docking system of claim 1, further comprising a base plate on which the charging circuit is positioned, a rear surface of the base plate engaging the front edge of the gang box, with a rear surface of the docking plate engaging a front surface of the base plate.

16. The modular docking system of claim 15, wherein the base plate provides an at least one elongate mounting aperture sized and positioned for allowing a screw to pass through said mounting apertures of each of the base plate and docking plate and be threadably engaged with the at least one free mounting tab of the gang box while also allowing the docking plate and base plate to be selectively offset relative to the corresponding mounting tab of the gang box.

17. The modular docking system of claim 1, wherein each of the at least one component adapter and corresponding component tab of the at least one electrical component provides an at least one mounting aperture sized and positioned for allowing a screw to pass therethrough and be threadably engaged with a free mounting tab of the gang box.

18. The modular docking system of claim 1, wherein each of the at least one component adapter and corresponding component tab of the at least one electrical component provides an at least one engagement aperture sized and allowing a screw to pass therethrough for removably securing said component adapter to said component tab.

19. A modular docking system for being installed adjacent to an at least one additional electrical component within a gang box, the system comprising:
 a docking plate engaging a front edge of the gang box and providing a perimeter wall protruding substantially perpendicularly from a front surface of the docking plate which receives an at least one computing device therewithin;
 the docking plate further providing an at least one elongate mounting aperture sized and positioned for allowing a screw to pass therethrough and be engaged with an at least one free mounting tab on the front edge of the gang box while also allowing the docking plate to be selectively offset relative to the corresponding mounting tab of the gang box;
 a charging circuit in electrical communication with an at least one electrical wire provided by the gang box, the charging circuit selectively providing power to the at least one computing device;
 a cover plate engaging the front surface of the docking plate, covering a perimeter of the computing device, and assisting in retaining the computing device within the docking plate; and
 an at least one component adapter engaging one of a pair of opposing component tabs of the at least one electrical component, the at least one component adapter sized for increasing a height of said electrical component so as to approximate a height of the docking plate;
 whereby, the system allows the at least one additional electrical component to be installed within the gang box adjacent to the docking plate and, thus, the computing device, regardless of the dimensions of the computing device.

20. A modular docking system for being installed adjacent to an at least one additional electrical component within a gang box, the system comprising:
 a device case sized for approximating the dimensions of a computing device and receiving the computing device therewithin;
 a docking plate engaging a front edge of the gang box and removably retaining the device case;
 the docking plate providing an at least one elongate mounting aperture sized and positioned for allowing a screw to pass therethrough and be engaged with an at least one free mounting tab on the front edge of the gang box while also allowing the docking plate to be selectively offset relative to the corresponding mounting tab of the gang box;

a charging circuit in electrical communication with an at least one electrical wire provided by the gang box;

an electrical device connector positioned within the device case such that the electrical device connector engages a corresponding docking port of the computing device when the computing device is positioned within the device case;

a rear surface of the device case providing an at least one case contact in electrical communication with the electrical device connector;

a front surface of the docking plate providing an at least one docking contact in electrical communication with the charging circuit;

each of the at least one case contact positioned for selectively contacting a corresponding one of the at least one docking contact when the device case is engaged with the docking plate, thereby allowing the charging circuit to provide power to the computing device; and an at least one component adapter engaging one of a pair of opposing component tabs of the at least one electrical component, the at least one component adapter sized for increasing a height of said electrical component so as to approximate a height of the docking plate;

whereby, the system allows the at least one additional electrical component to be installed within the gang box adjacent to the docking plate and, thus, the computing device, regardless of the dimensions of the computing device.

* * * * *